United States Patent
Lefebvre et al.

(10) Patent No.: US 11,800,413 B2
(45) Date of Patent: Oct. 24, 2023

(54) INFORMATION PROCESSING SYSTEM, INFORMATION PROCESSING APPARATUS, AND COMPUTER READABLE RECORDING MEDIUM

(71) Applicant: TOYOTA JIDOSHA KABUSHIKI KAISHA, Toyota (JP)

(72) Inventors: Sylvain Lefebvre, Toyota (JP); Ryo Neyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/372,712

(22) Filed: Jul. 12, 2021

(65) Prior Publication Data

US 2022/0053387 A1 Feb. 17, 2022

(30) Foreign Application Priority Data

Aug. 11, 2020 (JP) ................. 2020-135949

(51) Int. Cl.
*H04W 36/00* (2009.01)
*H04W 36/32* (2009.01)
(Continued)

(52) U.S. Cl.
CPC .... *H04W 36/0058* (2018.08); *G01C 21/3461* (2013.01); *H04W 4/40* (2018.02); *H04W 36/0085* (2018.08); *H04W 36/32* (2013.01)

(58) Field of Classification Search
CPC ... H04W 16/18; H04W 36/0058; H04W 4/40; H04W 36/0085; H04W 36/32; H04W 4/029; H04W 36/125; H04W 24/02; G01C 21/3461; G08G 1/012; G08G 1/0125; G08G 1/0137; H04L 67/12
See application file for complete search history.

(56) References Cited

U.S. PATENT DOCUMENTS

2011/0125344 A1* 5/2011 An .................. G08G 1/04
701/25
2012/0165024 A1* 6/2012 Sugahara ........... H04W 36/245
455/436

(Continued)

OTHER PUBLICATIONS

Copeland et al., "Technology assessment for mission-critical services on automotive virtual edge communicator (AVEC)", 2018, IEEEXplore, 8 pages (Year: 2018).*

(Continued)

*Primary Examiner* — Quoc Thai N Vu
(74) *Attorney, Agent, or Firm* — Oblon, McClelland, Maier & Neustadt, L.L.P.

(57) ABSTRACT

An information processing system includes: a first server associated with a first region, the first server including a first processor configured to output information concerning a predetermined service to a vehicle traveling in the first region; and the vehicle including a second processor, wherein the first processor is configured to perform handover processing for outputting information concerning the vehicle held by the first server to a second server associated with a second region adjacent to the first region when the vehicle moves from the first region to the second region in a case where the vehicle has moved to an outside of the first region and to an outside of an extended region obtained by extending the first region.

24 Claims, 5 Drawing Sheets

(51) Int. Cl.
    *G01C 21/34*     (2006.01)
    *H04W 4/40*     (2018.01)

(56) References Cited

U.S. PATENT DOCUMENTS

| | | | |
|---|---|---|---|
| 2014/0141784 A1* | 5/2014 | Schmidt | H04W 36/32 |
| | | | 455/437 |
| 2019/0077432 A1* | 3/2019 | Itagaki | B61L 27/20 |
| 2020/0213921 A1* | 7/2020 | Song | H04W 36/32 |
| 2022/0124593 A1* | 4/2022 | Mátray | H04W 36/32 |

OTHER PUBLICATIONS

Noura Aljeri et al., "Fog-Enabled Vehicular Networks: A New Challenge for Mobility Management." Internet Technology Letters. 2020;e141., https://doi.org/10.1002/itl2.141, 6 pages.

* cited by examiner

INFORMATION PROCESSING SYSTEM, INFORMATION PROCESSING APPARATUS, AND COMPUTER READABLE RECORDING MEDIUM

The present application claims priority to and incorporates by reference the entire contents of Japanese Patent Application No. 2020-135949 filed in Japan on Aug. 11, 2020.

BACKGROUND

The present disclosure relates to an information processing system, an information processing apparatus, and a computer readable recording medium.

Noura Aljeri, et al., "Fog-Enabled Vehicular Networks: A New Challenge for Mobility Management." Internet Technology Letters, Jan. 17, 2020, e141 discloses a handover processing technique for, when a vehicle moves among a plurality of regions, transferring data among bases in the regions.

SUMMARY

In the technique disclosed in Noura Aljeri, et al., for example, when division of the regions is dense, it is likely that, while the handover processing is performed between the bases, the vehicle further moves to another region and the handover processing is wasted. Accordingly, there is a need for a technique that reduces such a waste of the handover processing and efficiently perform the handover processing.

According to one aspect of the present disclosure, there is provided an information processing system including: a first server associated with a first region, the first server including a first processor configured to output information concerning a predetermined service to a vehicle traveling in the first region; and the vehicle including a second processor, wherein the first processor is configured to perform handover processing for outputting information concerning the vehicle held by the first server to a second server associated with a second region adjacent to the first region when the vehicle moves from the first region to the second region in a case where the vehicle has moved to an outside of the first region and to an outside of an extended region obtained by extending the first region.

DETAILED DESCRIPTION

An information processing system, an information processing apparatus, and a computer readable recording medium storing an information processing program according to an embodiment are explained with reference to the drawings. Note that components in the embodiment explained below include components replaceable and readily available by those skilled in the art or substantially same components.

The information processing system, the information processing apparatus, and the information processing program according to the embodiment are for an edge server associated with geographically distributed regions to perform communication with a traveling vehicle to thereby provide information concerning a predetermined service to the vehicle.

Figure 1:
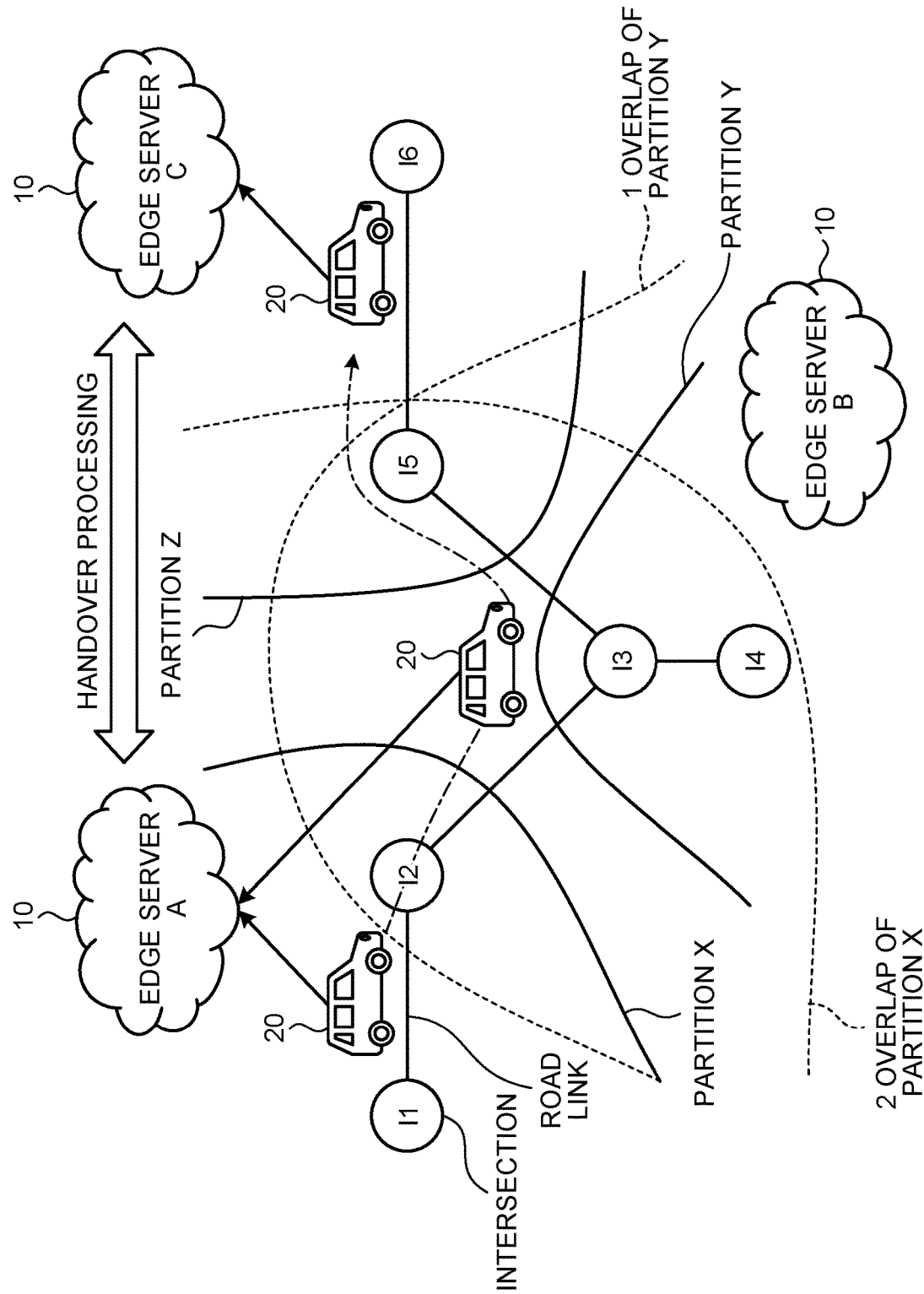
FIG. 1 is a diagram schematically illustrating a flow of handover processing by an information processing system according to an embodiment.

In this embodiment, as illustrated in FIG. 1, regions divided based on a predetermined rule in advance are described as "partitions" as well. In the figure, arrow lines connecting edge servers and a vehicle mean data communication between the edge servers and the vehicle, circles mean intersections, solid lines connecting the circles mean road links, solid lines drawn to cross the road links mean boundaries of the partitions, and broken lines mean boundaries of overlaps (extended regions) obtained by extending the partitions.

In FIG. 1, three partitions X, Y, and Z are illustrated as an example. The partition X is a region including intersections I1 and I2 and road links connecting the intersections I1 and I2. The partition Y is a region including intersections I3 and I4 and road links connecting the intersections I3 and I4. The partition Z is a region including intersections I5 and I6 and road links connecting the intersections I5 and I6.

When the edge servers provide a service to the vehicle, for example, as illustrated in FIG. 1, when the vehicle moves from the partition X to the partition Y, data concerning the vehicle is transferred from an edge server A associated with the partition X at an origin to an edge server B associated with the partition Y at a destination. This is called handover processing.

In this handover processing, for example, when division of the regions is dense or a moving time of the vehicle among the regions is shorter than a time required for the handover processing, the vehicle further moves to another region (for example, the partition Z) during the handover processing. The handover processing is wasted. Therefore, the information processing system, the information processing apparatus, and the information processing program according to the embodiment provide a technique that may reduce such a waste of the handover processing and efficiently perform the handover processing.

Figure 2:
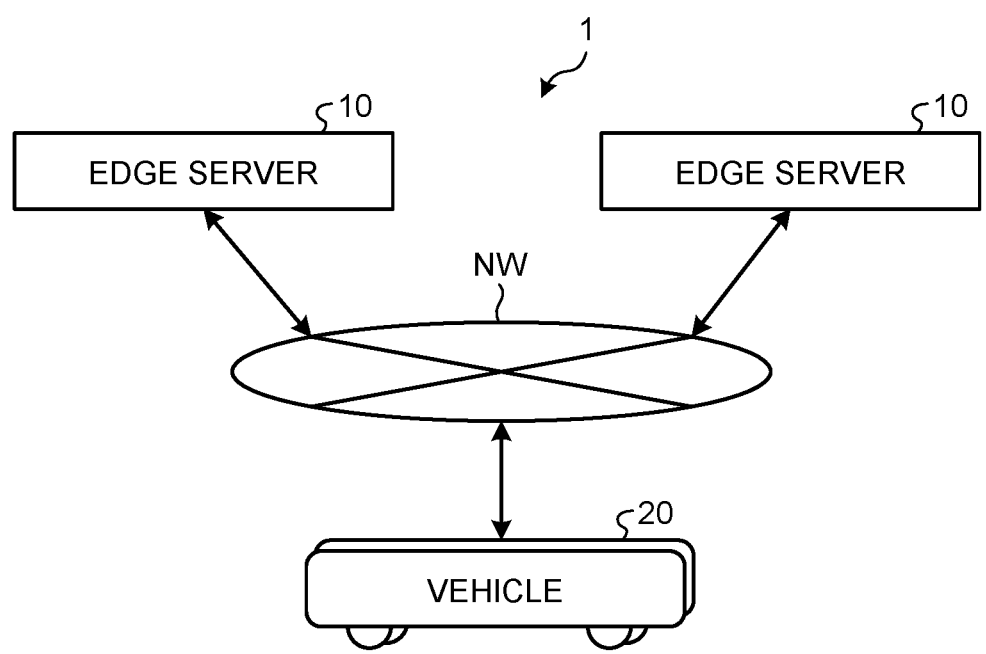
FIG. 2 is a diagram schematically illustrating the configuration of the information processing system according to the embodiment.

The information processing system according to this embodiment is explained with reference to FIGS. 1 to 3. An information processing system 1 includes, as illustrated in FIG. 2, a plurality of edge servers 10 and a vehicle 20. The information processing apparatus according to the embodiment is specifically realized by a function of the edge servers 10. Both of the edge servers 10 and the vehicle 20 include a communication function and are configured to be capable of communicating with each other through a network NW, This network NW is configured from, for example, an Internet line network, a cellular phone line network, or the like.

The edge servers 10 are servers for providing a predetermined service to a traveling vehicle. The edge servers 10 are realized by a general-purpose computer such as a work station or a personal computer. The edge servers 10 are respectively provided in a geographically distribute plurality of regions and associated with the regions. The edge servers 10 transmit (output) information concerning a predetermined service to the vehicle 20 traveling in the regions.

Note that, as the edge servers 10 configuring the information processing system 1, there are, as illustrated in FIG. 1, the edge server 10 (for example, the edge server A) that performed communication before the vehicle 20 moves between regions and the edge servers 10 (for example, edge servers B and C) that perform communication after the vehicle 20 moves between the regions. In the following explanation, processing of the edge server 10 at an origin is mainly explained. Processing of the edge server 10 at a destination is explained while clearly indicating the edge server 10 as "edge server 10 at the destination" every time.

Figure 3:
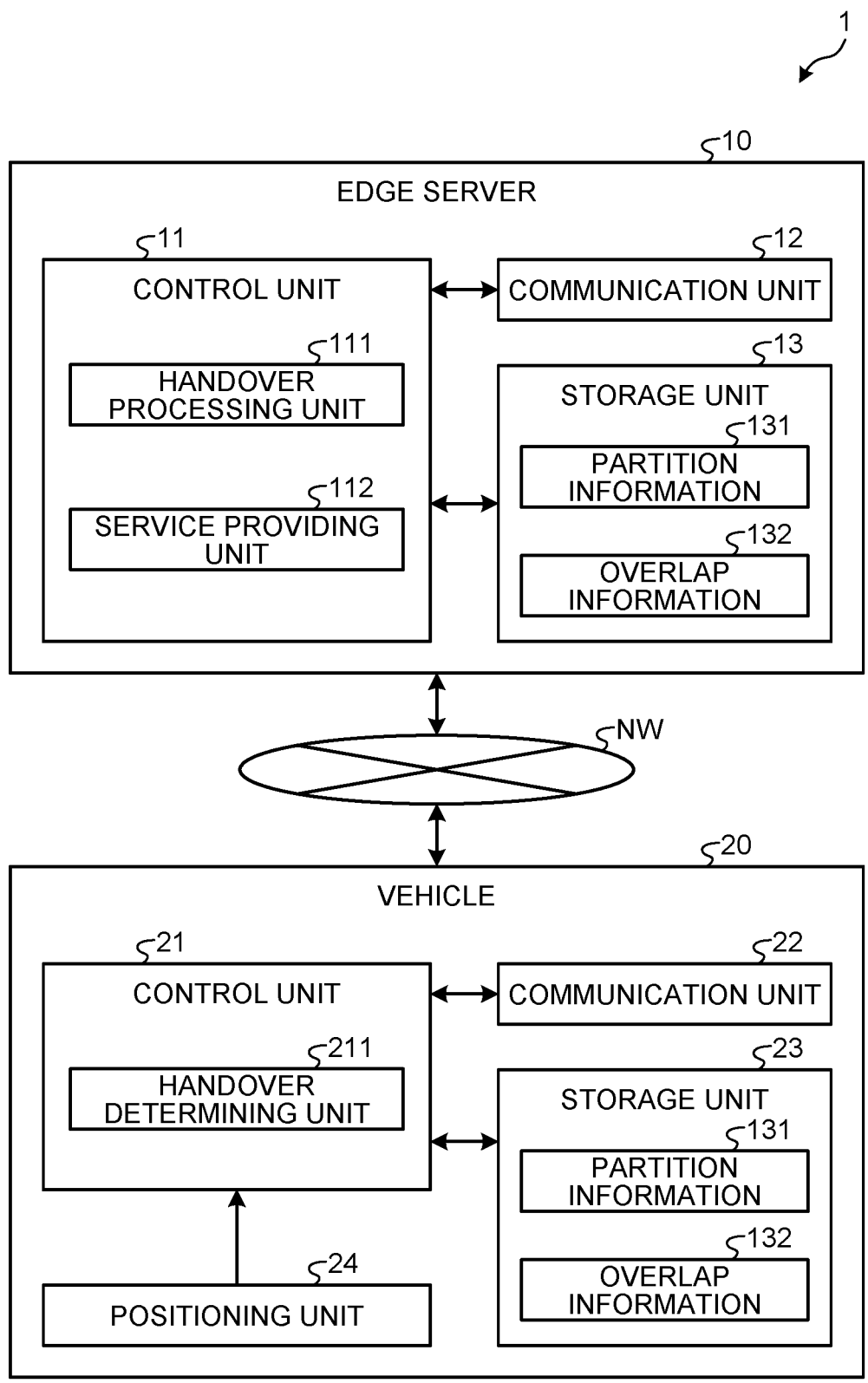
FIG. 3 is a block diagram illustrating details of components of the information processing system according to the embodiment.

The edge server 10 includes, as illustrated in FIG. 3, a control unit (a first processor) 11, a communication unit 12, and a storage unit 13. The control unit 11 specifically includes a processor configured by a central processing unit (CPU), a digital signal processor (DSP), a field-programmable gate array (FPGA), or the like and a memory (a main storage unit) configured by a random access memory (RAM), a read only memory (ROM), or the like.

The control unit 11 loads a program stored in the storage unit 13 to a work region of the main storage unit and executes the program and controls the constituent units and the like through the execution of the program to thereby realize a function matching a predetermined purpose. The control unit 11 functions as a handover processing unit 111 and a service providing unit 112 through the execution of the program stored in the storage unit 13.

The handover processing unit 111 performs the handover processing when the vehicle 20 moves from a region associated with the edge server 10 (hereinafter referred to a "region of the origin") to a region adjacent to the region of the origin (hereinafter referred to as "region of the destination").

Specifically, when the vehicle 20 moves to the outside of the region of the origin and the outside of an extended region obtained by extending the region of the origin, the handover processing unit 111 transmits information concerning the vehicle 20 held by the edge server 10 (the edge server 10 at the origin) (hereinafter, "vehicle information") to the edge server 10 (the edge server 10 at the destination) associated with the region of the destination. At that time, the handover processing unit 111 transmits the vehicle information to the edge server 10 in response to a request for the handover processing (hereinafter referred to as "handover processing request") from the edge server 10 at the destination.

The "extended region" indicates a region obtained by extending the regions based on a specific rule. In this embodiment, the extended region is described as "overlap" as well (see FIG. 1). The "vehicle information" is information relating to a service provided to the vehicle 20 by the edge server 10. For example, when the edge server 10 provides a driver's sleepiness detection notification service to the vehicle 20, examples of the vehicle information include driver's sleepiness history information.

For example, as illustrated in FIG. 1, it is assumed that the vehicle 20 moves in the three regions (partitions X, Y, and Z) in order. In this case, even if the vehicle 20 moves from the intersection I2 to the outside of the partition X and moves to the intersection I3 in the partition Y, the vehicle 20 is not outside the overlap of the partition X. Accordingly, in this case, the handover processing is not performed between the edge server A and the edge server B.

On the other hand, when the vehicle 20 moving to the intersection I3 moves to the intersection I6 in the partition Z, the vehicle 20 is outside the partition X and outside the overlap of the partition X. Accordingly, in this case, the handover processing is performed between the edge server A and the edge server C. In this way, the handover processing unit 111 performs the handover between the edge server 10 in the region of the origin and the edge server 10 in the region of the destination only when the vehicle 20 moves to the outside of the region of the origin and the outside of the extended region of the region of the origin. Consequently, it is possible to reduce a data transfer amount between edge servers 10.

Determination about whether the handover processing is performed between the edge server 10 at the origin and the edge server 10 at the destination (hereinafter referred to as "handover determination") may be performed on either the vehicle 20 side or the edge server 10 side.

When the handover determination is performed on the vehicle 20 side, a determination result to the effect that the vehicle 20 has moved to the outside of the region of the origin and the outside of the extended region is transmitted from a handover determining unit 211 of the vehicle 20 to the edge server 10 at the destination. In response to the determination result, the edge server 10 at the destination performs a handover processing request to the edge server 10 at the origin, whereby the handover processing is carried out.

On the other hand, when the handover determination is performed on the edge server 10 side, the edge server 10 at the destination determines, for example, based on position information of the vehicle 20 (hereinafter referred to as "vehicle position information") acquired from the vehicle 20, whether the vehicle 20 has moved to the outside of the region of the origin and the outside of the extended region. When determining that the vehicle 20 has moved to the outside of the region of the origin and the outside of the extended region, the edge server 10 at the destination performs the handover processing request to the edge server 10 at the origin, whereby the handover processing is carried out.

The extended region (the overlap) is set to a size with which a time necessary for transmitting and receiving the vehicle information among a plurality of edge servers (hereinafter referred to as "handover time") is longer than a time necessary for the vehicle 20 to move among a plurality of regions (hereinafter referred to as "vehicle moving time"), that is, the size with which "handover time>vehicle moving time". In this way, the appropriate size of the extended region is determined based on a relation between the handover time and the vehicle moving time. Consequently, it is possible to perform the handover processing only when necessary. It is possible to reduce a data transfer amount among the edge servers 10.

The extended region may be set in advance about the regions or may be set when the vehicle 20 travels in the regions. When the extended region is set in advance, for example, a first extended region and a second extended region wider than the first extended region are set in advance. One of the first extended region and the second extended region is selected based on the handover time and the vehicle moving time. In this case, when it is predicted that "handover time>vehicle moving time" in the first extended region, the handover determination is performed using the first extended region. On the other hand, when it is predicted that "handover timed-vehicle moving time" in the first extended region and "handover time>vehicle moving time" in the second extended region, the handover determination is performed using the second extended region.

When the extended region is set during traveling of the vehicle 20, for example, a region where it is predicted that "handover time>vehicle moving time" during the traveling is set as an extended region. The handover determination is performed using the extended region.

As illustrated in FIG. 1, the extended region may be determined based on a distance of a road network formed by intersections and road links connecting the intersections. Examples of the extended region determined based on the distance of the road network include a 1 overlap set about the partition Y in the figure and a 2 overlap set about the partition X in the figure.

The 1 overlap is a region including a first intersection included in the region of the origin, a second intersection, which is an intersection adjacent to the first intersection and indicates an intersection other than the first intersection, and a road link connecting the first intersection and the second intersection.

For example, in the case of the 1 overlap of the partition Y illustrated in FIG. 1, the first intersection is "intersections I3 and I4" and the second intersection is "intersections I2 and I5". Therefore, the 1 overlap of the partition Y is a region including the intersections I2, I3, I4, and I5 and road links connecting these intersections.

A 1 overlap $O_1(e)$ determined based on the distance of the road network may be represented by, for example, the following Expression (1). Note that, in the following Expression (1), P(e) indicates an intersection group covered by an edge server e, N(i) indicates an intersection group adjacent to an intersection i, and B(n) indicates an edge server covering an intersection n.

$$O_1(e) = \left\{ \forall n \in \bigcup_{i \in P(e)} N(i) : B(n) \neq e \right\} \quad (1)$$

The 2 overlap is a region including a first intersection included in the region of the origin, a second intersection, which is an intersection adjacent to the first intersection and indicates an intersection other than the first intersection, a third intersection, which is an intersection adjacent to the second intersection and indicates an intersection other than the first intersection and other than the second intersection, and road links connecting the first intersection, the second intersection, and the third intersection.

For example, in the case of the 2 overlap of the partition X illustrated in FIG. 1, the first intersection is "intersections I1 and I2", the second intersection is "intersections I3 and I4", and the third intersection is "intersection I5". Therefore, the 2 overlap of the partition X is a region including the intersections I1, I2, I3, I4, and I5 and road links connecting these intersections.

A 1 overlap $O_2(e)$ determined based on the distance of the road network may be represented by, for example, the following Expression (2). Note that, in the following Expression (2), $O_1(e)$ indicates the 1 overlap, N(v) indicates an intersection group adjacent to an intersection v, and B(n) indicates an edge server covering the intersection n.

$$O_2(e) = O_1(e) \cup \{\forall \tau \in O_1(e), \forall n \in N(v), B(n) \neq e\} \quad (2)$$

The extended region may be determined based on geographical distances from the regions. In this case, for example, several kilometers around the regions may be set as the extended region. By using the distance of the road network or the geographical distances from the regions in this way, it is possible to easily set the extended region.

The service providing unit 112 performs communication with the traveling vehicle 20 to thereby provide information concerning a predetermined service to the vehicle 20. Examples of the service provided by the service providing unit 112 include a service for managing a vehicle state and a history of the vehicle state (for example, a driver's sleepiness detection notification service based on data (CAN data and an interior image) collected from the vehicle), a distribution service for information concerning fallen objects, obstacles, road surface freezing, and the like on a road (hereinafter referred to as "road information") detected by other vehicles, and a distribution service for a dynamic map.

The communication unit 12 is configured from, for example, a local area network (LAN) interface board or a wireless communication circuit for wireless communication. The communication unit 12 is connected to the network NW such as the Internet, which is a public communication network. The communication unit 12 is connected to the network NW to thereby perform communication between the communication unit 12 and the vehicle 20.

The storage unit 13 is configured from a recording medium such as an erasable programmable ROM (EPROM), a hard disk drive (HDD), and a removable medium. Examples of the removable medium include a disk recording medium such as a universal serial bus (USB) memory, a compact disc (CD), a digital versatile disc (DVD), or a Blu-ray (registered trademark) Disc (BD). In the storage unit 13, an operating system (OS), various programs, various tables, various databases, and the like may be stored.

In the storage unit 13, partition information 131 and overlap information 132 are stored. The partition information 131 is information concerning the regions and includes information such as intersections configuring the respective regions and road links connecting the intersections. The overlap information 132 is information concerning the extended regions and includes information such as intersections configuring the respective extended regions and road links connecting the intersections. In the storage unit 13, vehicle information transmitted to the edge server 10 at the destination in the handover processing is stored according to necessity.

The vehicle 20 is a mobile body capable of communicating with the outside and performs communication with the edge servers 10 associated with the regions to thereby receive provision of a service.

The vehicle 20 includes a control unit (a second processor) 21, a communication unit 22, a storage unit 23, and a positioning unit 24. The control unit 21 is an electronic control unit (ECU) that collectively controls the operations of various components mounted on the vehicle 20. The control unit 21 functions as the handover determining unit 211 through execution of a program stored in the storage unit 23.

The handover determining unit 211 determines, based on the vehicle position information detected by the positioning unit 24, whether the vehicle 20 has moved to the outside of the region of the origin and the outside of the extended region. The handover determining unit 211 transmits a result of the determination to the edge server 10 at the destination.

The communication unit 22 is configured from, for example, a data communication module (DCM) and performs communication between the edge server 10 and the vehicle 20 by wireless communication via the network NW. In the storage unit 23, the partition information 131 and the overlap information 132 are stored. In the storage unit 23, the vehicle position information detected by the positioning unit 24 is stored according to necessity.

The positioning unit 24 receives a radio wave from a Global Positioning System (GPS) satellite and detects the vehicle position information. A detecting method for the vehicle position information is not limited to a method using the GPS satellite. For example, a combined method of light detection and ranging, laser imaging detection and ranging (LiDAR) and a three-dimensional digital map may be used. The positioning unit 24 transmits the detected vehicle position information to the handover determining unit 211 and the edge server 10 at the destination.

A first example of a processing procedure of an information processing method executed by the information processing system 1 according to the embodiment is explained with reference to FIG. 4. In the figure, processing in the case in which the handover determination is performed on the vehicle 20 side is explained.

First, the handover determining unit 211 of the vehicle 20 determines, for example, based on the vehicle position information, whether the vehicle 20 has moved to an adjacent partition (region) (step S1). When determining that the vehicle 20 has not moved to the adjacent partition (No in step S1), the handover determining unit 211 proceeds to step S1.

On the other hand, when determining that the vehicle 20 has moved to the adjacent partition (Yes in step S1), the handover determining unit 211 determines, for example, based on the vehicle position information, whether the vehicle 20 has moved to the outside of an overlap set with respect to the original partition (step S2). When determining that the vehicle 20 has not moved to the outside of the overlap set with respect to the original partition (No in step S2), the handover determining unit 211 proceeds to step S2.

On the other hand, when determining that the vehicle 20 has moved to the outside of the overlap set with respect to the original partition (Yes in step S2), the handover determining unit 211 transmits a result of the determination to the edge server 10 at the destination to thereby request the handover processing (step S3).

Subsequently, the handover processing unit 111 of the edge server 10 at the destination requests the edge server 10 at the origin to transmit vehicle information (step S4). Subsequently, the handover processing unit 111 of the edge server 10 at the origin transmits the vehicle information to the edge server 10 at the destination (step S5). Subsequently, the service providing unit 112 of the edge server 10 at the destination provides a predetermined service to the vehicle 20 (step S6). Accordingly, this processing ends.

A second example of a processing procedure of an information processing method executed by the information processing system 1 according to the embodiment is explained with reference to FIG. 4. In the figure, processing in the case in which the handover determination is performed on the edge server 10 side is explained.

First, the control unit 21 of the vehicle 20 transmits the vehicle position information to the edge server 10 at the destination (step S11). The handover processing unit 111 of the edge server 10 at the destination determines, based on the vehicle position information, whether the vehicle 20 has moved to an adjacent partition (region) (step S12). When determining that the vehicle 20 has not moved to the adjacent partition (No in step S12), the handover processing unit 111 proceeds to step S12.

On the other hand, when determining that the vehicle 20 has moved to the adjacent partition (Yes in step S12), the handover processing unit 111 determines, based on the vehicle position information, whether the vehicle 20 has moved to the outside of an overlap set with respect to the original partition (step S13). When determining that the vehicle 20 has not moved to the outside of the overlap set with respect to the original partition (No in step S13), the handover processing unit 111 proceeds to step S13.

On the other hand, when determining that the vehicle 20 has moved to the outside of the overlap set with respect to the original partition (Yes in step S13), the handover processing unit 111 requests the handover processing, that is, transmission of vehicle information (step S14).

Subsequently, the handover processing unit 111 of the edge server 10 at the origin transmits the vehicle information to the edge server 10 at the destination (step S15). Subsequently, the service providing unit 112 of the edge server 10 at the destination provides a predetermined service to the vehicle 20 (step S16). Accordingly, this processing ends.

As explained above, with the information processing system 1, the information processing device, and the information processing program according to the embodiment, it is possible to reduce a data transfer amount among the edge servers 10 by performing the handover processing only when necessary. Consequently, it is possible to reduce a waste of the handover processing and efficiently perform the handover processing.

Further effects and modifications may be easily derived by those skilled in the art. Accordingly, a wider aspect of the present disclosure is not limited to specific details and the representative embodiment represented and described above. Therefore, various changes are possible without departing from the spirit or the scope of the concept defined by the appended claims and equivalents of the claims.

Figure 4:
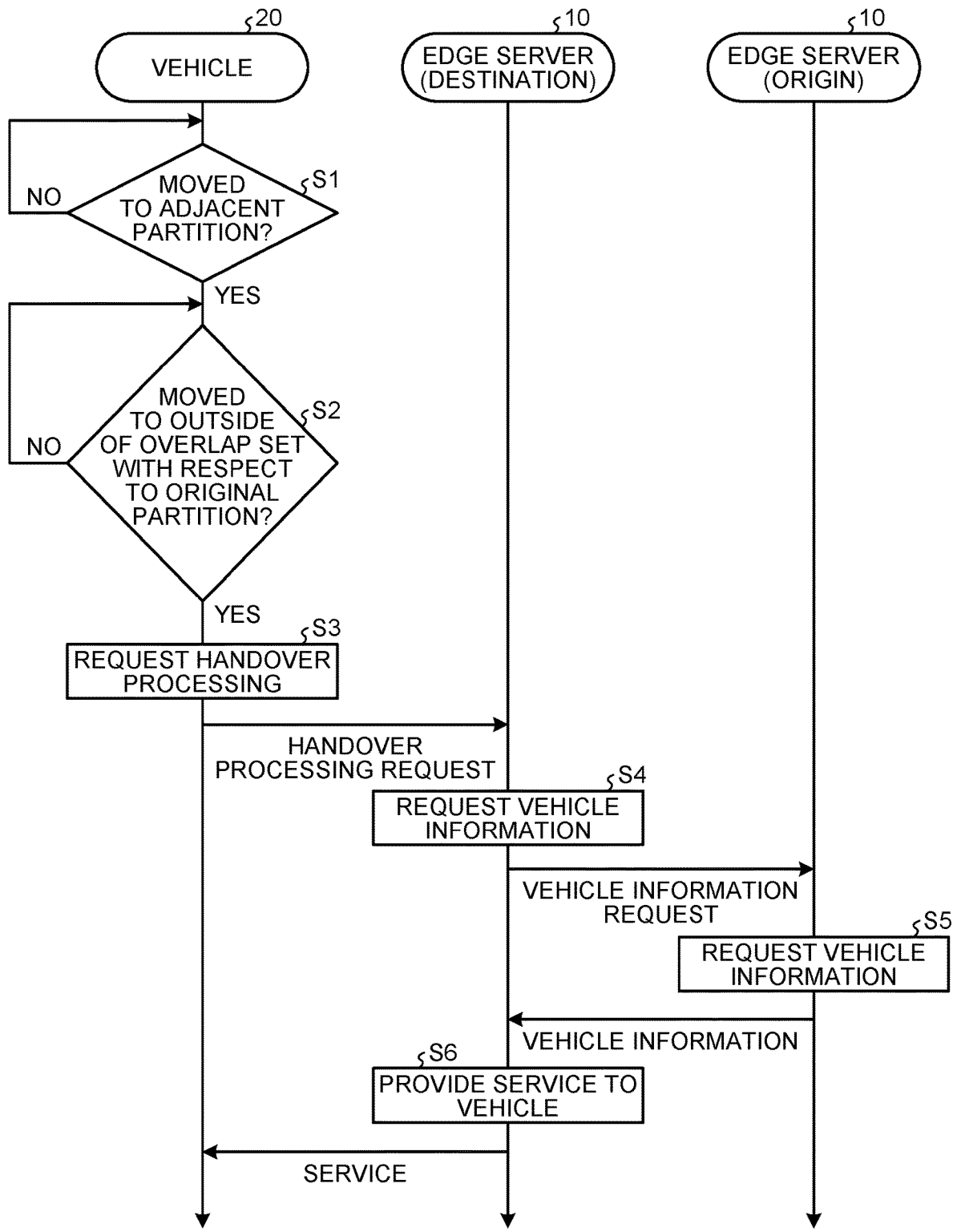
FIG. 4 is a flowchart illustrating a first example of an information processing method executed by the information processing system according to the embodiment.

For example, in the first example of the information processing method according to the embodiment, the edge server 10 at the origin transmits the vehicle information to the edge server 10 at the destination in response to the request from the edge server 10 at the destination (see steps S4 and S5 in FIG. 4). However, the edge server 10 at the origin may transmit the vehicle information to the edge server 10 at the destination without the request from the edge server 10 at the destination.

In this case, when determining that the vehicle 20 has moved to the outside of the overlap set with respect to the original partition (Yes in step S2), the handover determining unit 211 of the vehicle 20 transmits the handover processing request to the edge server 10 at the origin. In response to the handover processing request, the handover processing unit 111 of the edge server 10 at the origin transmits the vehicle information to the edge server 10 at the destination.

Figure 5:
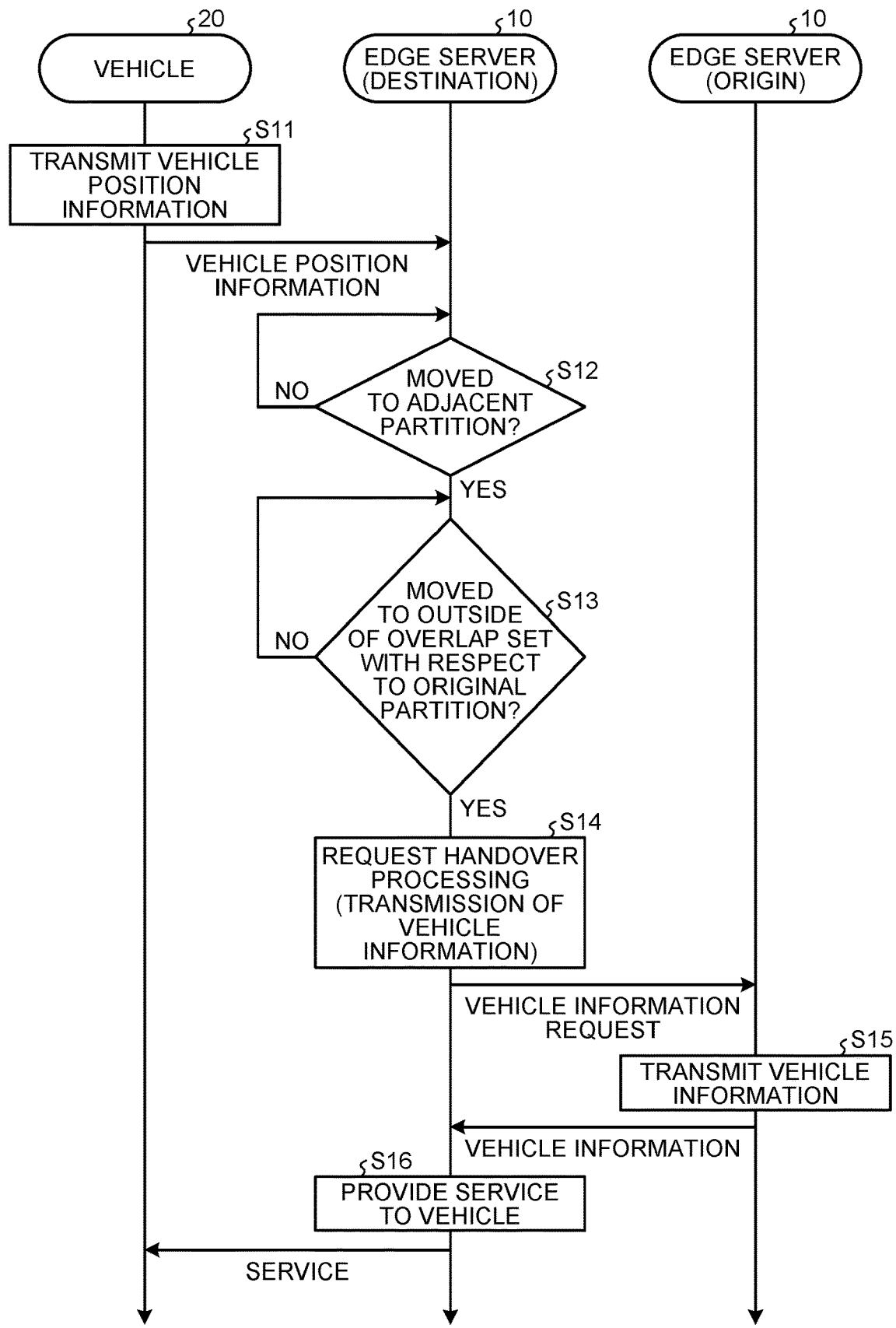
FIG. 5 is a flowchart illustrating a second example of the information processing method executed by the information processing system according to the embodiment.

In the second example of the information processing method according to the embodiment, the edge server 10 at the origin transmits the vehicle information to the edge server 10 at the destination in response to the request from the edge server 10 at the destination (see steps S14 and S15 in FIG. 5). However, the edge server 10 at the origin may transmit the vehicle information to the edge server 10 at the destination without the request from the edge server 10 at the destination.

In this case, the vehicle 20 transmits the vehicle position information to the edge server 10 at the origin. Subsequently, the handover processing unit 111 of the edge server 10 at the origin determines, based on the vehicle position information, whether the vehicle 20 has moved to the adjacent partition (region) and whether the vehicle 20 has moved to the outside of the overlap set with respect to the original partition. When the handover processing unit 111 determines that the vehicle 20 has moved to the outside of the overlap set with respect to the original partition, the handover processing unit 111 transmits the vehicle information to the edge server 10 at the destination.

According to the present disclosure, it is possible to reduce a waste of the handover processing and efficiently perform the handover processing.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
   a first server associated with a first region, the first server comprising a first processor configured to output information concerning a predetermined service to a vehicle traveling in the first region; and
   the vehicle comprising a second processor, wherein
   the first processor is configured to perform handover processing for outputting information concerning the vehicle held by the first server to a second server associated with a second region adjacent to the first region when the vehicle moves from the first region to the second region only in a case where the vehicle has moved to an outside of the first region and to an outside of an extended region, and
   the extended region is not included in the first region and is formed so as to surround the first region.

2. The information processing system according to claim 1, wherein the extended region is set to a size with which a handover time necessary for transmitting and receiving the information concerning the vehicle between the first and the second servers is longer than a vehicle moving time necessary for the vehicle to move between the first and the second regions.

3. The information processing system according to claim 1, wherein the extended region is determined based on a distance of a road network including intersections and road links connecting the intersections.

4. The information processing system according to claim 3, wherein the extended region includes:
   a first intersection included in the first region;
   a second intersection that is an intersection adjacent to the first intersection and indicates an intersection other than the first intersection; and
   a road link connecting the first intersection and the second intersection.

5. The information processing system according to claim 3, wherein the extended region includes:
   a first intersection included in the first region;
   a second intersection that is an intersection adjacent to the first intersection and indicates an intersection other than the first intersection;
   a third intersection that is an intersection adjacent to the second intersection and indicates an intersection other than the first intersection and other than the second intersection; and
   road links connecting the first intersection, the second intersection, and the third intersection.

6. The information processing system according to claim 1, wherein the extended region is determined based on a geographical distance from the first region.

7. The information processing system according to claim 1, wherein,
   the second processor is configured to determine whether the vehicle has moved to the outside of the first region and the outside of the extended region when the vehicle moves from the first region to the second region, and
   the first processor is configured to perform the handover processing when the second processor determines that the vehicle has moved to the outside of the first region and the outside of the extended region.

8. The information processing system according to claim 1, wherein the first processor is configured to:
   determine whether the vehicle has moved to the outside of the first region and the outside of the extended region when the vehicle moves from the first region to the second region; and
   perform the handover processing when determining that the vehicle has moved to the outside of the first region and the outside of the extended region.

9. An information processing apparatus associated with a first region, the information processing apparatus comprising
   a processor configured to output information concerning a predetermined service to a vehicle traveling in the first region, wherein
   the processor is configured to perform handover processing for outputting information concerning the vehicle to another information processing apparatus associated with a second region adjacent to the first region when the vehicle moves from the first region to the second region, only in a case where the vehicle has moved to an outside of the first region and an outside of an extended region, and
   the extended region is not included in the first region and is formed so as to surround the first region.

10. The information processing apparatus according to claim 9, wherein the extended region is set to a size with which a handover time necessary for transmitting and receiving the information concerning the vehicle between the information processing apparatus and the other information processing apparatus is longer than a vehicle moving time necessary for the vehicle to move between the first and the second regions.

11. The information processing apparatus according to claim 9, wherein the extended region is determined based on a distance of a road network including intersections and road links connecting the intersections.

12. The information processing apparatus according to claim 11, wherein the extended region includes:
    a first intersection included in the first region;
    a second intersection that is an intersection adjacent to the first intersection and indicates an intersection other than the first intersection; and
    a road link connecting the first intersection and the second intersection.

13. The information processing apparatus according to claim 11, wherein the extended region includes:
    a first intersection included in the first region;
    a second intersection that is an intersection adjacent to the first intersection and indicates an intersection other than the first intersection;
    a third intersection that is an intersection adjacent to the second intersection and indicates an intersection other than the first intersection and other than the second intersection; and
    road links connecting the first intersection, the second intersection, and the third intersection.

14. The information processing apparatus according to claim 9, wherein the extended region is determined based on a geographical distance from the first region.

15. The information processing apparatus according to claim 9, wherein the processor is configured to perform the handover processing when the vehicle moves from the first region to the second region in a case where the vehicle determines that the vehicle has moved to the outside of the first region and the outside of the extended region.

16. The information processing apparatus according to claim 9, wherein the processor is configured to:
determine whether the vehicle has moved to the outside of the first region and the outside of the extended region when the vehicle moves from the first region to the second region, and
perform the handover processing when determining that the vehicle has moved to the outside of the first region and the outside of the extended region.

17. A non-transitory computer-readable recording medium on which an executable program is recorded, the program causing a processor of a computer associated with a first region to execute:
outputting information concerning a predetermined service to a vehicle traveling in the first region;
performing handover processing for outputting information concerning the vehicle to an information processing apparatus associated with a second region adjacent to the first region when the vehicle moves from the first region to the second region only in a case where the vehicle has moved to an outside of the first region and an outside of an extended region,
wherein the extended region is not included in the first region and is formed so as to surround the first region.

18. The non-transitory computer-readable recording medium according to claim 17, wherein the extended region is set to a size with which a handover time necessary for transmitting and receiving the information concerning the vehicle between the computer and the information processing apparatus is longer than a vehicle moving time necessary for the vehicle to move between the first and the second regions.

19. The non-transitory computer-readable recording medium according to claim 17, wherein the extended region is determined based on a distance of a road network including intersections and road links connecting the intersections.

20. The non-transitory computer-readable recording medium according to claim 19, wherein the extended region includes:
a first intersection included in the first region;
a second intersection that is an intersection adjacent to the first intersection and indicates an intersection other than the first intersection; and
a road link connecting the first intersection and the second intersection.

21. The non-transitory computer-readable recording medium according to claim 19, wherein the extended region includes:
a first intersection included in the first region;
a second intersection that is an intersection adjacent to the first intersection and indicates an intersection other than the first intersection;
a third intersection that is an intersection adjacent to the second intersection and indicates an intersection other than the first intersection and other than the second intersection; and
road links connecting the first intersection, the second intersection, and the third intersection.

22. The non-transitory computer-readable recording medium according to claim 17, wherein the extended region is determined based on a geographical distance from the first region.

23. The non-transitory computer-readable recording medium according to claim 17, wherein the program causes the processor to execute performing the handover processing when the vehicle moves from the first region to the second region in a case where the vehicle has moved to the outside of the first region and the outside of the extended region.

24. The non-transitory computer-readable recording medium according to claim 17, wherein the program causes the processor to execute:
determining whether the vehicle has moved to the outside of the first region and the outside of the extended region when the vehicle moves from the first region to the second region; and
performing the handover processing when determining that the vehicle has moved to the outside of the first region and the outside of the extended region.

* * * * *